(12) United States Patent
Chen

(10) Patent No.: US 11,318,664 B2
(45) Date of Patent: May 3, 2022

(54) ADHERING DEVICE AND ADHERING METHOD

(71) Applicant: Wuhan China Star Optoelectronics Semiconductor Display Technology Co., Ltd., Wuhan (CN)

(72) Inventor: Shimin Chen, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 194 days.

(21) Appl. No.: 16/638,155

(22) PCT Filed: Nov. 6, 2019

(86) PCT No.: PCT/CN2019/115860
§ 371 (c)(1),
(2) Date: Feb. 11, 2020

(87) PCT Pub. No.: WO2021/077465
PCT Pub. Date: Apr. 29, 2021

(65) Prior Publication Data
US 2021/0370582 A1  Dec. 2, 2021

(30) Foreign Application Priority Data

Oct. 21, 2019 (CN) .......................... 201910999348.9

(51) Int. Cl.
*B29C 63/00* (2006.01)
*B29L 31/34* (2006.01)

(52) U.S. Cl.
CPC ...... *B29C 63/0073* (2013.01); *B29C 63/0004* (2013.01); *B29C 63/0091* (2013.01); *B29L 2031/3475* (2013.01)

(58) Field of Classification Search
CPC ...... B29C 2063/0008; B29C 2063/022; B29C 63/0073; B29C 63/0004; B29C 63/0091; B29C 63/024; B29C 63/22; B29C 63/26; B29C 63/28; B29C 63/30; B29C 63/0047; B29C 65/7802; B29C 65/7841; B29C 66/342; B29C 66/345; B29C 66/93–9392; B32B 38/1866; B32B 37/003; B32B 37/0046; B32B 37/1018; B32B 37/10; B30B 15/161; B30B 15/20; B29L 2031/3475
(Continued)

(56) References Cited

U.S. PATENT DOCUMENTS 3,416,433 A * 12/1968 Gutnikov ................ B30B 15/20
100/48
5,152,855 A * 10/1992 Jansman ........... A61M 25/0009
156/580.2
(Continued)

*Primary Examiner* — John L Goff, II

(57) ABSTRACT

The adhering device of the present application includes a chamber; a carrying platform having a groove formed thereon; a pressing block assembly for supporting the flexible display panel, and fitting the flexible display panel toward the curved cover plate at a preset rising speed; a clamp assembly for holding the flexible display panel, and when the flexible display panel is adhered to the curved cover plate at a preset ascending speed, the clamp assembly starts to rotate until the flexible display panel and the curved cover plate completely adhere together with the display panel separation.

10 Claims, 3 Drawing Sheets

(58) Field of Classification Search
USPC .................................... 156/580–583.91
See application file for complete search history.

(56) References Cited

U.S. PATENT DOCUMENTS

| | | | |
|---|---|---|---|
| 2003/0190386 A1* | 10/2003 | Fujita | B29C 45/68 425/589 |
| 2010/0018365 A1* | 1/2010 | Tyler | B25B 5/163 81/423 |
| 2010/0071847 A1* | 3/2010 | Shin | H01L 21/67092 156/285 |
| 2014/0002975 A1* | 1/2014 | Lee | H05K 5/0217 361/679.01 |
| 2016/0257107 A1* | 9/2016 | Yamada | H05K 3/361 |

* cited by examiner

ADHERING DEVICE AND ADHERING METHOD

RELATED APPLICATIONS

This application is a National Phase of PCT Patent Application No. PCT/CN2019/115860 having International filing date of Nov. 6, 2019, which claims the benefit of priority of Chinese Patent Application No. 201910999348.9 filed on Oct. 21, 2019. The contents of the above applications are all incorporated by reference as if fully set forth herein in their entirety.

FIELD AND BACKGROUND OF THE INVENTION

The present application relates to the display technology, and particularly, to an adhering device and an adhering method.

As flexible display technology becomes more and more mature, the requirements for a curved cover plate to adhere on a flexible display panel are becoming higher and higher. Current adhering devices are difficult to meet the requirements, and it is easy to have poor adherence, which seriously affects adhering quality.

SUMMARY OF THE INVENTION

The present application provides an adhering device and an adhering method, which can solve the technical problem that the existing curved cover plate and the flexible display panel are adhering together, which causes poor adhering and seriously affects the adhering quality.

The embodiment of the present application provides an adhering device for adhering a curved cover plate to a flexible display panel, the adhering device comprising: a chamber; a carrying platform disposed in the chamber, wherein the carrying platform is provided with a groove for mounting the curved cover plate therein; a pressing block assembly disposed in the chamber, wherein the pressing block assembly is used to support the flexible display panel, and the flexible display panel is adhered toward the curved cover plate at the preset speed; a clamp assembly disposed in the chamber, wherein the clamp assembly is used to clamp the flexible display panel, the clamp assembly comprises a rotary drive device, and when the flexible display panel is adhered toward the curved cover plate at a preset speed, the rotary drive device controls the clamp assembly to rotate until the flexible display panel and the curved cover plate are completely adhered; the clamp assembly comprising a first clamp and a second clamp, wherein the first clamp is clamped on a first side of the flexible display panel, the second clamp is clamped on a second side of the flexible display panel, and the first side is opposite to the second side; the pressing block assembly comprising a pressing block, wherein a surface of the pressing block is provided with a curved protrusion adapted to an inner contour of the curved cover plate.

In the adhering device of the present application, the rotary drive device is connected to the first clamp and the second clamp, and the rotary drive device is used to control rotation of the first clamp and the second clamp.

In the adhering device of the present application, a clamping surface of the first clamp and a clamping surface of the second clamp are provided with an anti-adhesive layer.

In the adhering device of the present application, the pressing block assembly further comprises a rising drive device, the rising drive device is connected to the pressing block, and the rising drive device is used to drive the pressing block.

In the adhering device of the present application, the chamber comprises a first portion and a second portion, and the first portion is detachably connected to the second portion.

In the adhering device of the present application, the chamber is provided with an air pumping hole; the adhering device further comprises a vacuuming device, and the vacuuming device is connected to the air pumping hole for the chamber is evacuated.

The embodiment of the present application further provides an adhering device for adhering a curved cover plate to a flexible display panel, the adhering device comprising: a chamber; a carrying platform, the carrying platform disposed in the chamber, wherein the carrying platform is provided with a groove for mounting the curved cover plate therein; a pressing block assembly disposed in the chamber, wherein the pressing block assembly is used to support the flexible display panel, and the flexible display panel is adhered toward the curved cover plate at a preset speed; a clamp assembly, the clamp assembly is disposed in the chamber, wherein the clamp assembly is used to clamp the flexible display panel, the clamp assembly comprises a rotary drive device, and when the flexible display panel is adhered toward the curved cover plate at the preset speed, the rotary drive device controls the clamp assembly to rotate until the flexible display panel and the curved cover plate are completely adhered.

In the adhering device of the present application, the clamp assembly comprises a first clamp and a second clamp; the first clamp is clamped on a first side of the flexible display panel, and the second clamp is clamped on a second side of the flexible display panel, and the first side is opposite to the second side.

In the adhering device of the present application, the rotary drive device is connected to the first clamp and the second clamp, and the rotary drive device is used to control rotation of the first clamp and the second clamp.

In the adhering device of the present application, a clamping surface of the first clamp and a clamping surface of the second clamp are provided with an anti-adhesive layer.

In the adhering device of the present application, the chamber comprises a first portion and a second portion, and the first portion is detachably connected to the second portion.

In the adhering device of the present application, the chamber is provided with an air pumping hole; the adhering device further comprises a vacuuming device, and the vacuuming device is connected to the air pumping hole for the chamber is evacuated.

In the adhering device of the present application, the chamber comprises a first portion and a second portion, and the first portion is detachably connected to the second portion.

In the adhering device of the present application, the chamber is provided with an air pumping hole; the adhering device further comprises a vacuuming device, and the vacuuming device is connected to the air pumping hole for the chamber is evacuated.

The embodiment of the present application further provides an adhering method, which is performed by using the adhering device described above, and the adhering method comprising the steps of: flexing a flexible display panel to a predetermined arc and clamping the flexible display panel by a clamp assembly; vacuuming a chamber and raising the flexible display panel to a preset adhering position; controlling an pressing block assembly to adhere the flexible display panel toward the curved cover plate at a preset rising speed, and controlling the clamp assembly to rotate at a preset rotational speed until the flexible display panel and the curved cover plate are completely adhered, and then the clamp assembly is separated from the display panel.

In the adhering method of the present application, the preset rising speed and the preset rotating speed are matched with a simulation calculation.

The adhering device and the adhering method provided by the embodiments of the present application provide a rotating function to the clamp assembly, and the clamp assembly is synchronously rotated when the pressing block assembly is pressed against the flexible display panel, and the clamp assembly can continuously fix the flexible display panel to prevent the edge of the flexible display panel and the edge of the curved cover plate from contacting the pressing block assembly prematurely, thereby avoiding bubbles between the curved cover plate and the flexible display panel, thereby improving the adhering quality.

BRIEF DESCRIPTION OF THE SEVERAL VIEWS OF THE DRAWINGS

In order to more clearly illustrate the embodiments of the present application or the technical solutions in the prior art, the drawings used in the embodiments will be briefly described below. The drawings in the following description are only partial embodiments of the present application, and those skilled in the art can obtain other drawings according to the drawings without any creative work.

DESCRIPTION OF SPECIFIC EMBODIMENTS OF THE INVENTION

Figure 1:
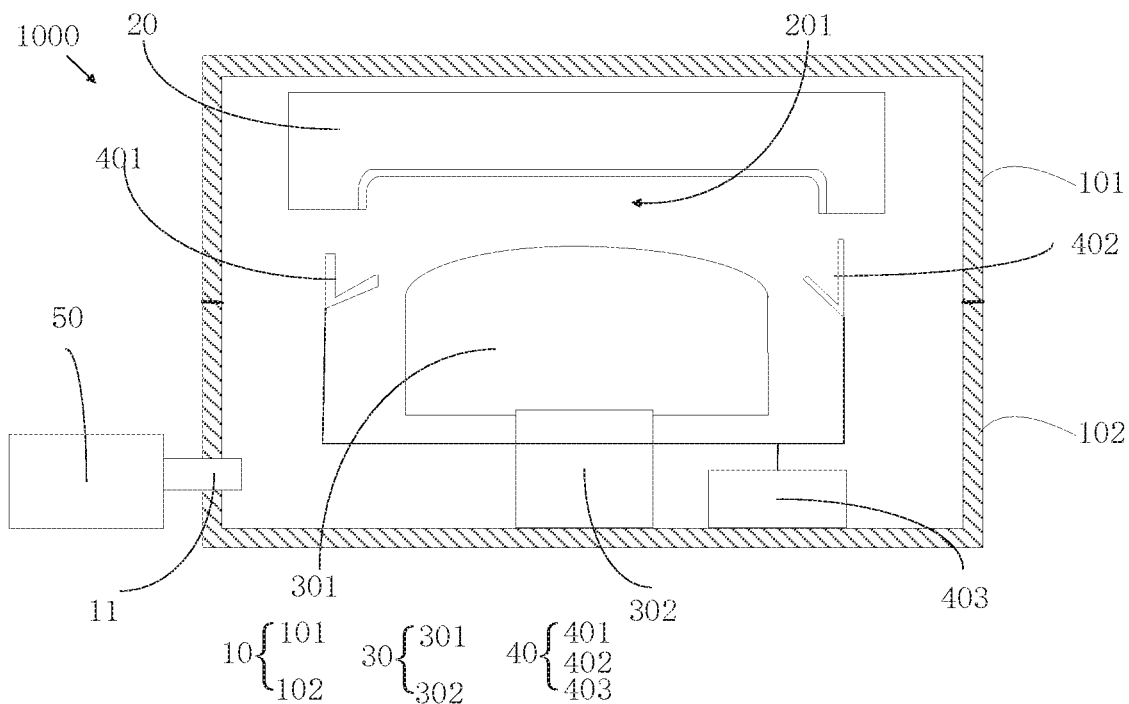
FIG. 1 is a schematic structural view of an adhering device according to an embodiment of the present application.

The embodiments of the present application are described in detail below, and the examples of the embodiments are illustrated in the drawings, wherein the same or similar reference numerals are used to refer to the same or similar elements or elements having the same or similar functions. The embodiments described below with reference to the accompanying drawings are intended to be illustrative, and are not to be construed as limiting.

In the description of the present application, it is to be understood that the terms "center", "longitudinal", "transverse", "length", "width", "thickness", "upper", "lower", "front", "Orientations of "post", "left", "right", "vertical", "horizontal", "top", "bottom", "inside", "outside", "clockwise", "counterclockwise", etc. The positional relationship is based on the orientation or positional relationship shown in the drawings, and is merely for the convenience of describing the present application and the simplified description, and does not indicate or imply that the device or component referred to, has a specific orientation, and is constructed and operated in a specific orientation. Therefore, it should not be construed as limiting the application. Moreover, the terms "first" and "second" are used for descriptive purposes only and are not to be construed as indicating or implying a relative importance or implicitly indicating the number of technical features indicated. Thus, features defining "first" or "second" may include one or more of the described features either explicitly or implicitly. In the description of the present application, the meaning of "plurality" is two or more, unless specifically defined otherwise.

Please refer to FIG. 1, where FIG. 1 is a schematic structural view of an adhering device according to an embodiment of the present application. An adhering device 1000 is used to adhere a curved cover plate to a flexible display panel. The adhering device 1000 comprises a chamber 10, a carrying platform 20, a pressing block assembly 30, a clamp assembly 40, and a vacuuming device 50.

Wherein the chamber 10 is provided with an air pumping hole 11. The vacuuming device 50 is connected to the air pumping hole 11 for evacuating the chamber 10. It should be noted that the position of the air pumping hole 11 is not limited herein, and may be set as needed.

In some embodiments, the chamber 10 comprises a first portion 101 and a second portion 102, where the first portion 101 is detachably connected to the second portion 102. It can be understood that the first portion 101 is the upper cover of the chamber 10, and the second portion 102 is the bottom case of the chamber 10. In use, the first portion 101 and the second portion 102 can be separated to insert the flexible display panel and the curved cover plate into the chamber 10.

Wherein the carrying platform 20 disposed in the chamber 10. The carrying platform 20 is provided with a groove 201 for mounting the curved cover plate therein. It can be understood that a fixing structure can be disposed in the groove 201 so that the curved cover plate can be fixedly mounted in the groove 201. For example, the groove 201 can be provided with a snap structure.

The pressing block assembly 30 disposed in the chamber 10. Wherein the pressing block assembly 30 is used to support the flexible display panel, and the flexible display panel is adhered toward the curved cover plate at a preset speed.

Specifically, the pressing block assembly 30 comprises a pressing block 301 and a rising drive device 302. The surface of the pressing block 301 is provided with a curved protrusion adapted to an inner contour of the curved cover plate. The rising drive device 302 is connected to the pressing block 301, and the rising drive device 302 is used to drive the pressing block 301.

In some embodiments, the pressing block 301 can be made of an elastic material such as rubber or silicone. The rising drive device 302 can be a motor-driven lifting device or a cylinder-driven lifting device, which are common driving structures in the prior art, so that they do not need to be described too much.

Wherein the clamp assembly 40 disposed in the chamber 10. The clamp assembly 40 is used to clamp the flexible display panel, the clamp assembly 40 comprises a rotary drive device 403, and when the flexible display panel is adhered toward the curved cover plate at a preset speed, the rotary drive device controls the clamp assembly to rotate until the flexible display panel and the curved cover plate are completely adhered. It should be noted that the preset speed can be set according to the needs of those skilled in the art.

That is, by the rotary drive device 403, the clamp assembly 40 is synchronously rotated when the pressing block assembly 30 is pressed against the flexible display panel, and the clamp assembly 40 can continuously fix the flexible display panel to prevent the edge of the flexible display panel and the edge of the curved cover plate from contacting the pressing block assembly 30 prematurely, thereby avoiding bubbles between the curved cover plate and the flexible display panel, thereby improving the adhering quality.

Specifically, the clamp assembly 40 comprises a first clamp 401, a second clamp 402, and a rotary drive device 403. The first clamp 401 is clamped on a first side of the flexible display panel, and the second clamp 402 is clamped on a second side of the flexible display panel, and the first side is opposite to the second side. The rotary drive device 403 is connected to the first clamp 401 and the second clamp 402, and the rotary drive device 403 is used to control rotation the first clamp 401 and the second clamp 402. The rotary drive device 403 can be implemented using a motor, such as a stepper motor. In some embodiments, a clamping surface of the first clamp 401 and a clamping surface of the second clamp 402 are provided with an anti-adhesive layer.

In some embodiments, the clamp assembly 40 can be rotated and disengaged by prior art structures, such as a three-axis drive device in combination with a rotary motor.

The adhering device provided by the embodiments of the present application provide a rotating function to the clamp assembly, and the clamp assembly is synchronously rotated when the pressing block assembly is pressed against the flexible display panel, and the clamp assembly can continuously fix the flexible display panel to prevent the edge of the flexible display panel and the edge of the curved cover plate from contacting the pressing block assembly prematurely, thereby avoiding bubbles between the curved cover plate and the flexible display panel, thereby improving the adhering quality.

Figure 2:
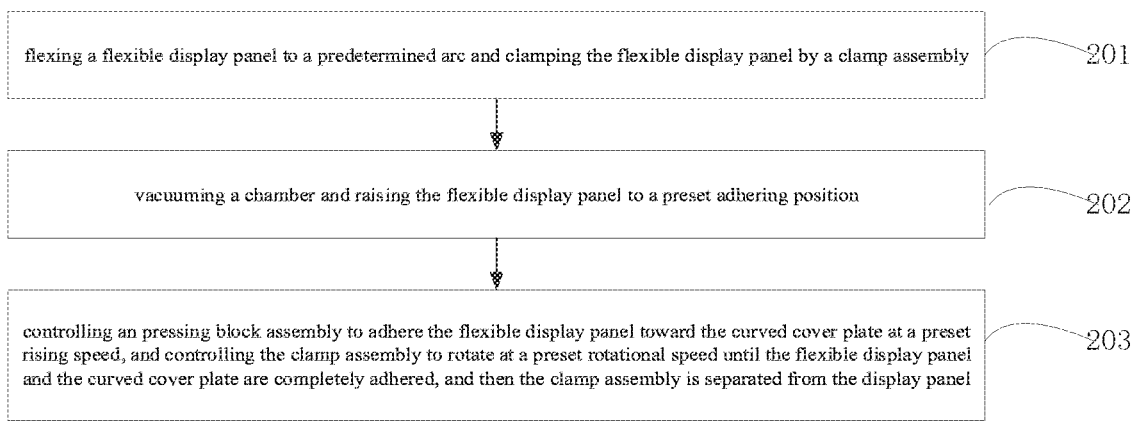
FIG. 2 is a schematic flow chart of a method for adhering a curved cover plate of a flexible display panel according to an embodiment of the present application.

Please refer to FIG. 2, FIG. 2 is a schematic flow chart of a method for adhering a curved cover plate of a flexible display panel according to an embodiment of the present application. The adhering method provided by the embodiment of the present application is performed by using the above-mentioned adhering device. The adhering method comprises the steps of: step 201 is flexing a flexible display panel to a predetermined arc and clamping the flexible display panel by a clamp assembly; step 202 is vacuuming a chamber and raising the flexible display panel to a preset adhering position; step 203 is controlling an pressing block assembly to adhere the flexible display panel toward the curved cover plate at a preset rising speed, and controlling the clamp assembly to rotate at a preset rotational speed until the flexible display panel and the curved cover plate are completely adhered, and then the clamp assembly is separated from the display panel.

Figure 3:
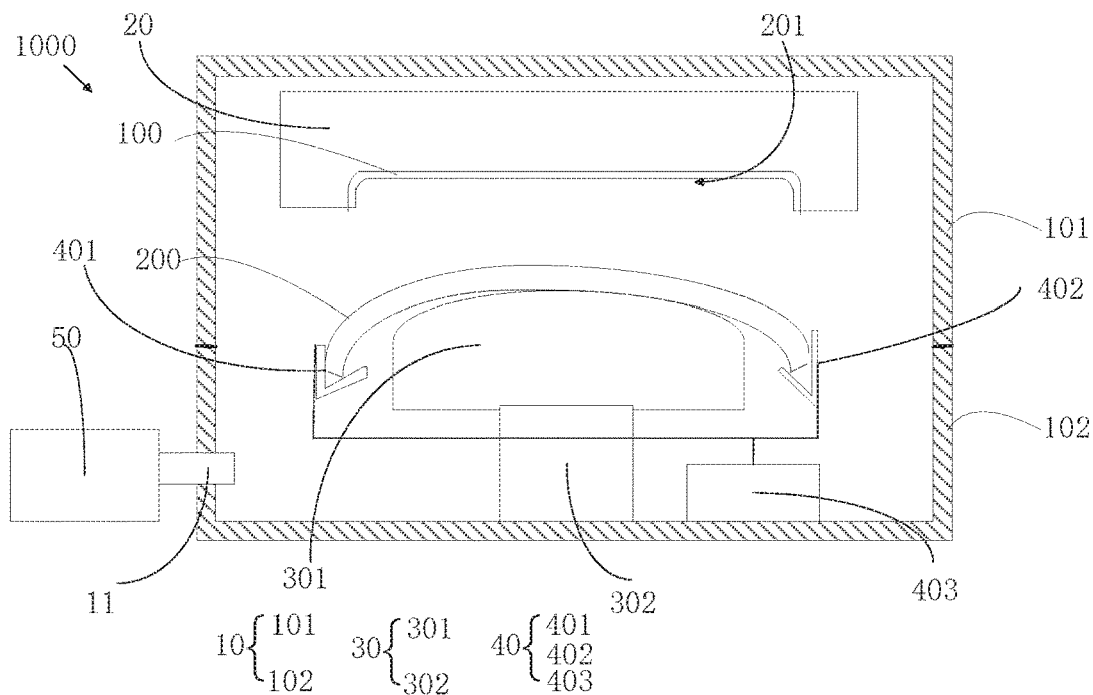
FIG. 3 is a first operational scene diagram of a method for adhering the curved cover plate of the flexible display panel according to an embodiment of the present application.
Figure 4:
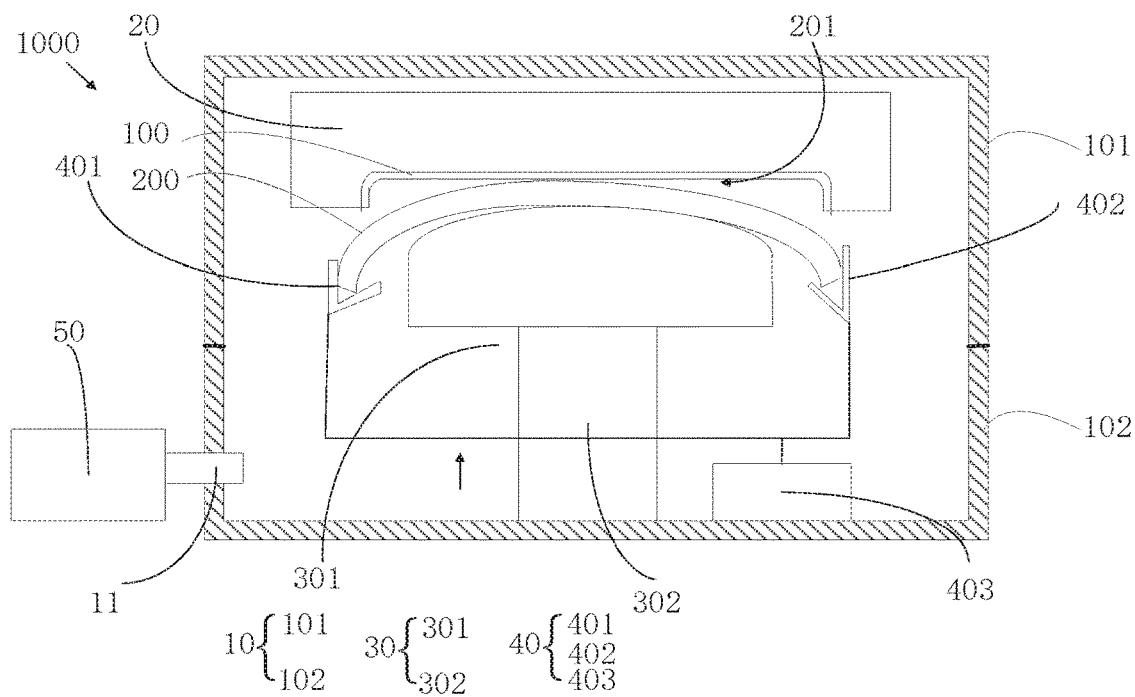
FIG. 4 is a second operational scene diagram of a method for adhering the curved cover plate of the flexible display panel according to an embodiment of the present application.
Figure 5:
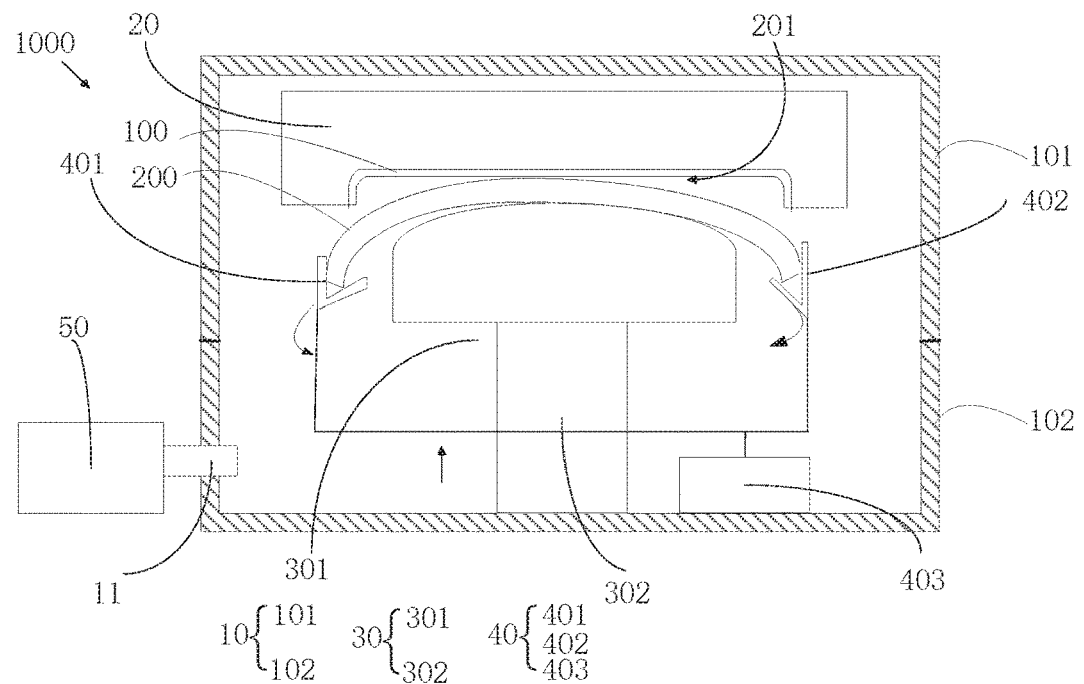
FIG. 5 is a third operational scene diagram of a method for adhering the curved cover plate of the flexible display panel according to an embodiment of the present application.
Figure 6:
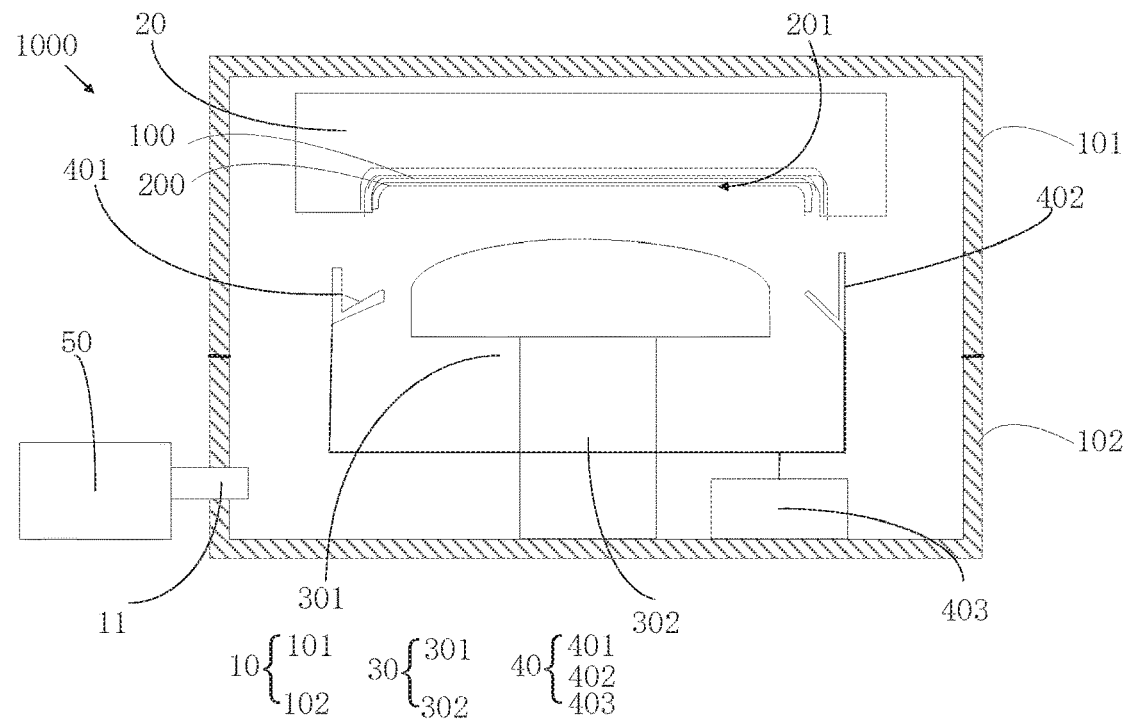
FIG. 6 is a fourth operational scene diagram of a method for adhering the curved cover plate of the flexible display panel according to an embodiment of the present application.

Specifically, please refer to FIG. 3-FIG. 6 at the same time, FIG. 3 is a first operational scene diagram of a method for adhering the curved cover plate of the flexible display panel according to an embodiment of the present application; FIG. 4 is a second operational scene diagram of a method for adhering the curved cover plate of the flexible display panel according to an embodiment of the present application. FIG. 5 is a third operational scene diagram of a method for adhering the curved cover plate of the flexible display panel according to an embodiment of the present application. FIG. 6 is a fourth operational scene diagram of a method for adhering the curved cover plate of the flexible display panel according to an embodiment of the present application.

In the step 201, the flexible display panel 200 is bent by a predetermined arc, and the first clamp 401 and the second clamp 402 of the adhering device 1000 are respectively clamped on the opposite sides of the two un-curved sides of the flexible display panel 200, the first clamp 401 and the second clamp 402 are rotatable along the sides. In operation, the first portion 101 of the adhering device 1000 is opened, wherein the preset curvature is less than the curvature of the pressing block of the adhering device 1000.

In the step 202, the bent flexible display panel 200 is placed on the pressing block 301 of the adhering device 1000. Wherein, after the flexible display panel 200 disposed on the pressing block 301, the first portion 101 and the second portion 102 are closed to achieve sealing. The chamber 10 of the adhering device 1000 is evacuated, and the pressing block assembly 30 is moved to move the flexible display panel 200 toward the groove 201 of the carrying platform 20 of the adhering device 1000 to raise the flexible display panel 200 to preset fit position.

In the step 203, the pressing block assembly 30 lifts the flexible display panel 200 at a preset rising speed, and controls the clamp assembly 40 to rotate from the outer sides of the first clamp 401 and the second clamp 402 toward the direction away from the groove 201, after the flexible display panel 200 completely enters the groove 201, the first clamp 401 and the second clamp 402 are separated from the flexible display panel 200.

Wherein the first clamp 401 and the second clamp 402 can continuously hold the flexible display panel 200 and the curved cover plate 100 without contacting the optical cover layer, and the optical adhesive layer does not pull the adhesive. An optical adhesive layer is adhered to the upper surface of the flexible display panel 200. The clamping surface of the first clamp 401 and the clamping surface of the second clamp 402 are both provided with a release layer to prevent the first clamp 401 and the second clamp 402 from bonding with the optical adhesive layer.

Wherein the preset rotation speed of the first clamp 401 and the second clamp 402 and the preset rising speed of the pressing block 301 can be matched by simulation calculation, and a specific value is obtained through simulation and simulation, and the first fixture is at the end of the fitting operation. The first clamp 401 and the second clamp 402 are quickly retracted to be separated from the flexible display panel 200, and the pressing block 301 continues to press upward and hold the pressure. Since some of the edges of the display panel are not in contact with the curved cover plate in advance, the air bubbles are effectively discharged through the pressing of the abutting block.

The adhering device and the adhering method provided by the embodiments of the present application provide a rotating function to the clamp assembly, and the clamp assembly is synchronously rotated when the pressing block assembly is pressed against the flexible display panel, and the clamp assembly can continuously fix the flexible display panel to prevent the edge of the flexible display panel and the edge of the curved cover plate from contacting the pressing block assembly prematurely, thereby avoiding bubbles between the curved cover plate and the flexible display panel, thereby improving the adhering quality.

Although the present application has been disclosed in the above preferred embodiments, the preferred embodiments are not intended to limit the application, and various modifications and changes can be made by those skilled in the art without departing from the spirit and scope of the application. Therefore, the scope of protection of this application is subject to the scope defined by the claims.

What is claimed is:

1. An adhering device for adhering a curved cover plate to a flexible display panel, the adhering device comprising:
    a chamber, wherein the chamber comprises a first portion and a second portion, and the first portion is detachably connected to the second portion;
    a carrying platform disposed in the chamber, wherein the carrying platform is provided with a groove for mounting the curved cover plate therein;
    a pressing block assembly disposed in the chamber, wherein the pressing block assembly supports the flexible display panel and moves the flexible display panel at a preset speed toward the curved cover plate to adhere to the curved cover plate; and
    a clamp assembly disposed in the chamber, wherein the clamp assembly clamps the flexible display panel, the clamp assembly comprises a rotary drive device, and when the flexible display panel is moved toward the curved cover plate at the preset speed, the rotary drive device controls the clamp assembly to rotate until the flexible display panel and the curved cover plate are completely adhered to each other;
    wherein the clamp assembly comprises a first clamp and a second clamp, the first clamp clamps a first side of the flexible display panel, the second clamp clamps a second side of the flexible display panel, and the first side is opposite to the second side, wherein the rotary drive device is connected to the first clamp and the second clamp, and the rotary drive device drives simultaneous movement and synchronous rotation of the first clamp and the second clamp;
    wherein the pressing block assembly comprises a pressing block, and a surface of the pressing block is provided with a curved protrusion adapted to an inner contour of the curved cover plate.

2. The adhering device of claim 1, wherein a clamping surface of the first clamp and a clamping surface of the second clamp are provided with an anti-adhesive layer.

3. The adhering device of claim 1, wherein the pressing block assembly further comprises a rising drive device, the rising drive device is connected to the pressing block, and the rising drive device drives the pressing block.

4. The adhering device of claim 1, wherein the chamber is provided with an air pumping hole; the adhering device further comprises a vacuuming device, and the vacuuming device is connected to the air pumping hole for vacuuming the chamber.

5. An adhering device for adhering a curved cover plate to a flexible display panel, the adhering device comprising:
    a chamber, wherein the chamber comprises a first portion and a second portion, and the first portion is detachably connected to the second portion;
    a carrying platform, the carrying platform disposed in the chamber, wherein the carrying platform is provided with a groove for mounting the curved cover plate therein;
    a pressing block assembly disposed in the chamber, wherein the pressing block assembly supports the flexible display panel and moves the flexible display panel at a preset speed toward the curved cover plate to adhere to the curved cover plate; and
    a clamp assembly, disposed in the chamber, wherein the clamp assembly clamps the flexible display panel, the clamp assembly comprises a rotary drive device, and when the flexible display panel is moved toward the curved cover plate at the preset speed, the rotary drive device controls the clamp assembly to rotate until the flexible display panel and the curved cover plate are completely adhered to each other;
    wherein the clamp assembly comprises a first clamp and a second clamp, the first clamp clamps a first side of the flexible display panel, the second clamp clamps a second side of the flexible display panel, the first side is opposite to the second side, wherein the rotary drive device is connected to the first clamp and the second clamp, and the rotary drive device drives simultaneous movement and synchronous rotation of the first clamp and the second clamp.

6. The adhering device of claim 5, wherein a clamping surface of the first clamp and a clamping surface of the second clamp are provided with an anti-adhesive layer.

7. The adhering device of claim 5, wherein the chamber is provided with an air pumping hole, the adhering device further comprises a vacuuming device, and the vacuuming device is connected to the air pumping hole for vacuuming the chamber.

8. The adhering device of claim 5, wherein the pressing block assembly further comprises a rising drive device, the rising drive device is connected to a pressing block, and the rising drive device drives the pressing block.

9. An adhering method for adhering a curved cover plate to a flexible display panel comprising the adhering device as claimed in claim 5, the adhering method comprising the steps of:
    flexing the flexible display panel to a predetermined arc and clamping the flexible display panel by the clamp assembly;
    vacuuming the chamber and raising the flexible display panel to a preset adhering position;
    controlling the pressing block assembly to move the flexible display panel at the preset speed to adhere to the curved cover plate, and controlling the clamp assembly to rotate at a preset rotational speed until the flexible display panel and the curved cover plate are completely adhered to each other, and then the clamp assembly is separated from the display panel.

10. The adhering method of claim 9, wherein the preset speed coordinates with the preset rotating speed through a simulation calculation.

* * * * *